Figure 1:
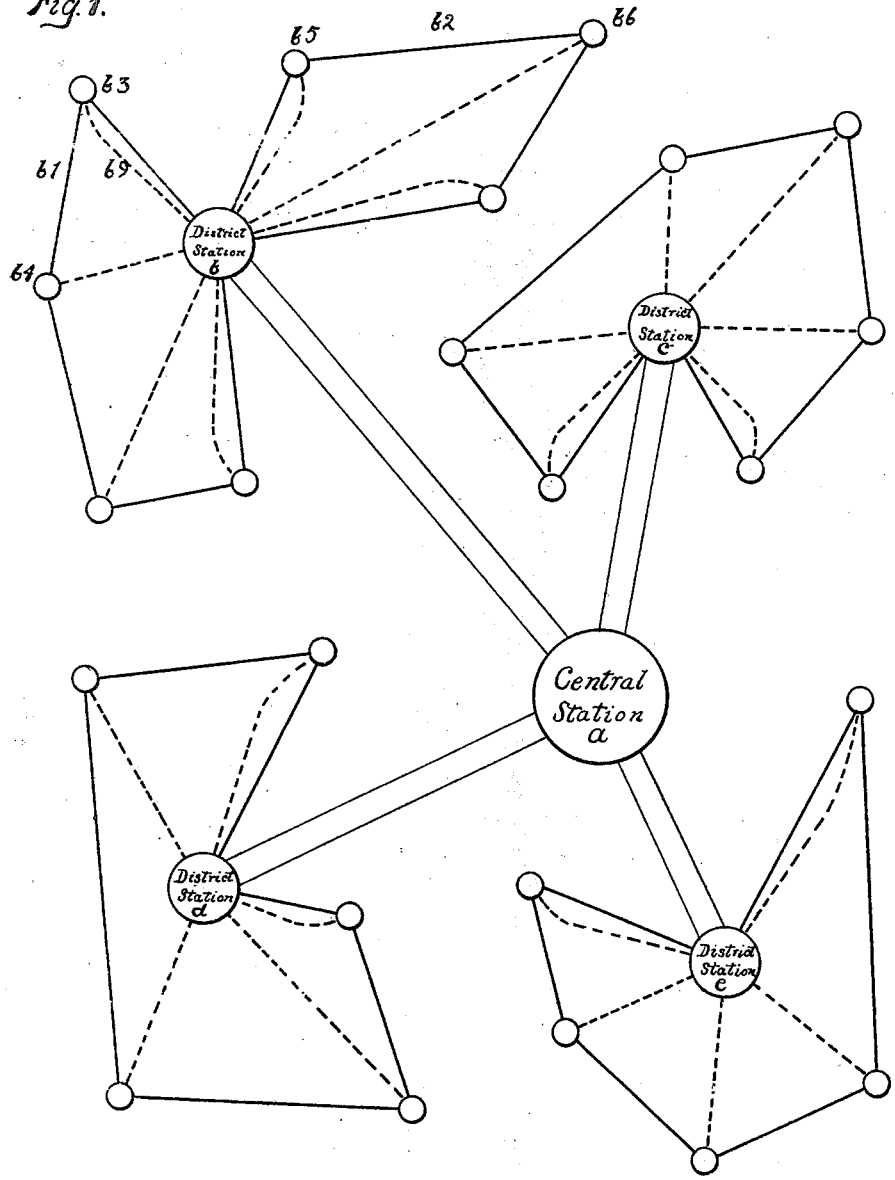

No. 697,065. Patented Apr. 8, 1902.
C. E. BEACH.
APPARATUS FOR THE TRANSMISSION OF SIGNALS.
(Application filed Apr. 6, 1896.)

(No Model.) 7 Sheets—Sheet 1.

WITNESSES: INVENTOR
S H Chase Clarence E. Beach,
H. W. Doughty

No. 697,065. Patented Apr. 8, 1902.
C. E. BEACH.
APPARATUS FOR THE TRANSMISSION OF SIGNALS.
(Application filed Apr. 6, 1896.)
(No Model.) 7 Sheets—Sheet 2.
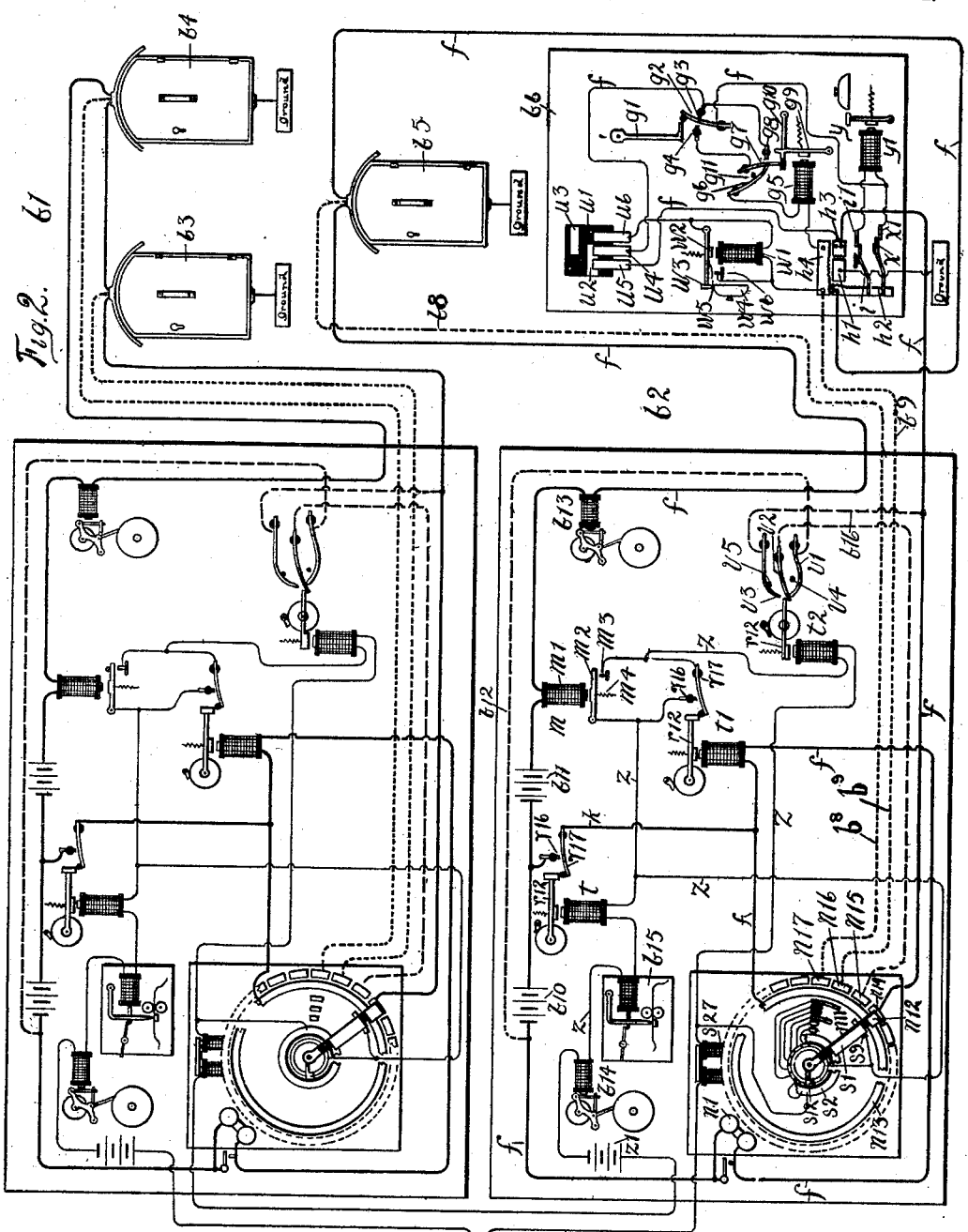
WITNESSES: S. H. Chase, H. W. Doughty.
INVENTOR Clarence E. Beach.

No. 697,065. Patented Apr. 8, 1902.
C. E. BEACH.
APPARATUS FOR THE TRANSMISSION OF SIGNALS.
(Application filed Apr. 6, 1896.)
(No Model.) 7 Sheets—Sheet 3.
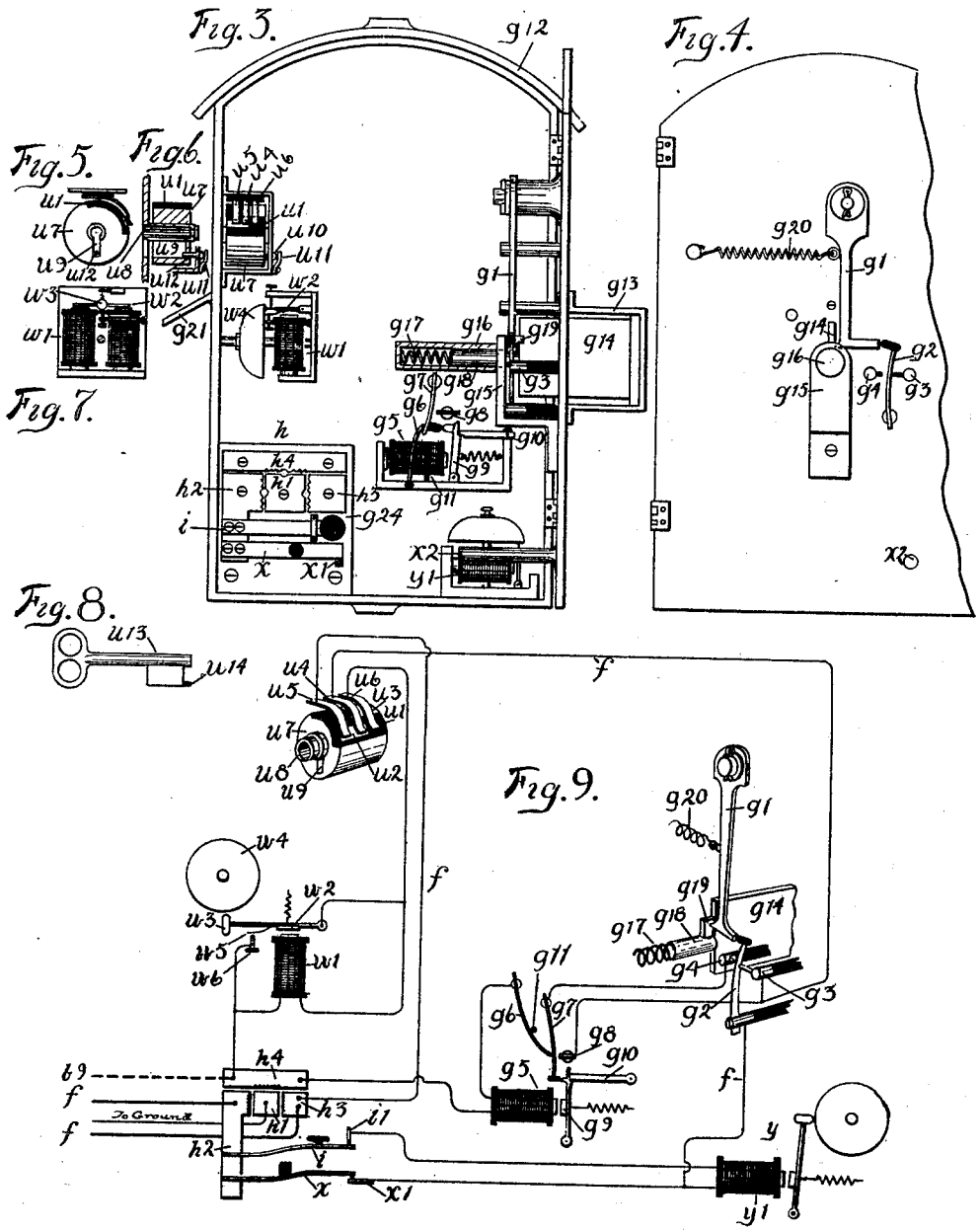
WITNESSES: S H Chase, H W Doughty
INVENTOR Clarence E. Beach No. 697,065. Patented Apr. 8, 1902.
C. E. BEACH.
APPARATUS FOR THE TRANSMISSION OF SIGNALS.
(Application filed Apr. 6, 1896.)
(No Model.) 7 Sheets—Sheet 4.
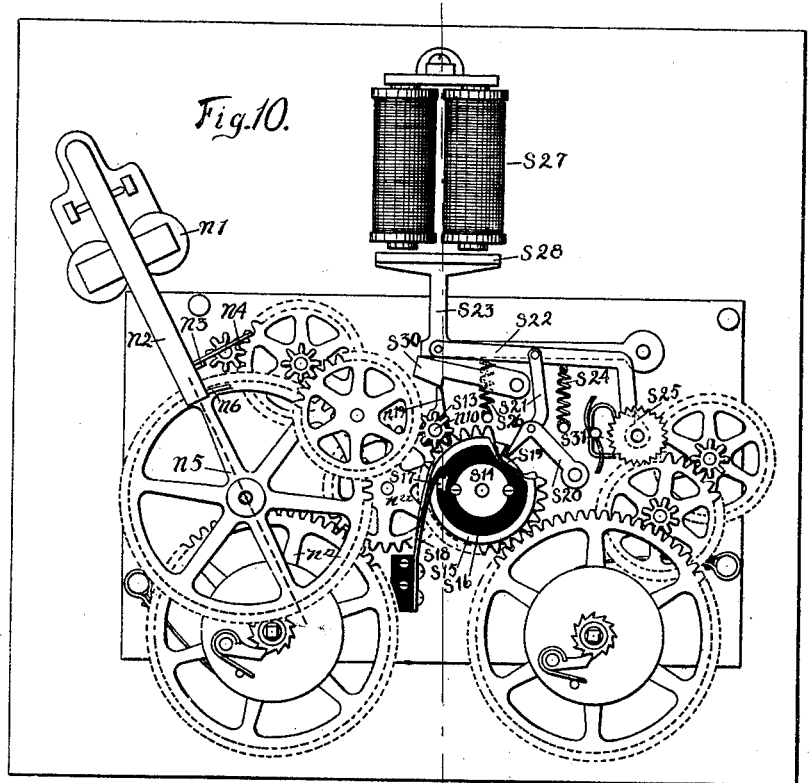
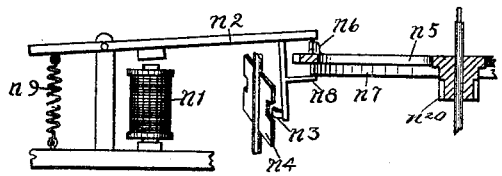
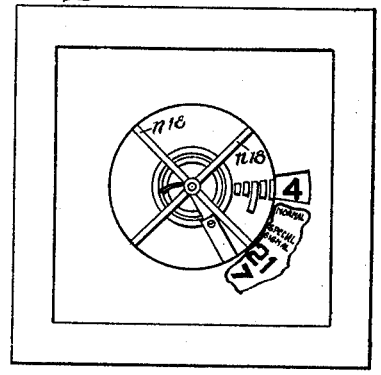
WITNESSES: S H Chase, H W Doughty
INVENTOR Clarence E. Beach No. 697,065. Patented Apr. 8, 1902.
C. E. BEACH.
APPARATUS FOR THE TRANSMISSION OF SIGNALS.
(Application filed Apr. 6, 1896.)
(No Model.) 7 Sheets—Sheet 5.

WITNESSES: S H Chase

INVENTOR Clarence E. Beach

No. 697,065. Patented Apr. 8, 1902.
C. E. BEACH.
APPARATUS FOR THE TRANSMISSION OF SIGNALS.
(Application filed Apr. 6, 1896.)
(No Model.) 7 Sheets—Sheet 6.

No. 697,065. Patented Apr. 8, 1902.
C. E. BEACH.
APPARATUS FOR THE TRANSMISSION OF SIGNALS.
(Application filed Apr. 6, 1896.)
(No Model.) 7 Sheets—Sheet 7.
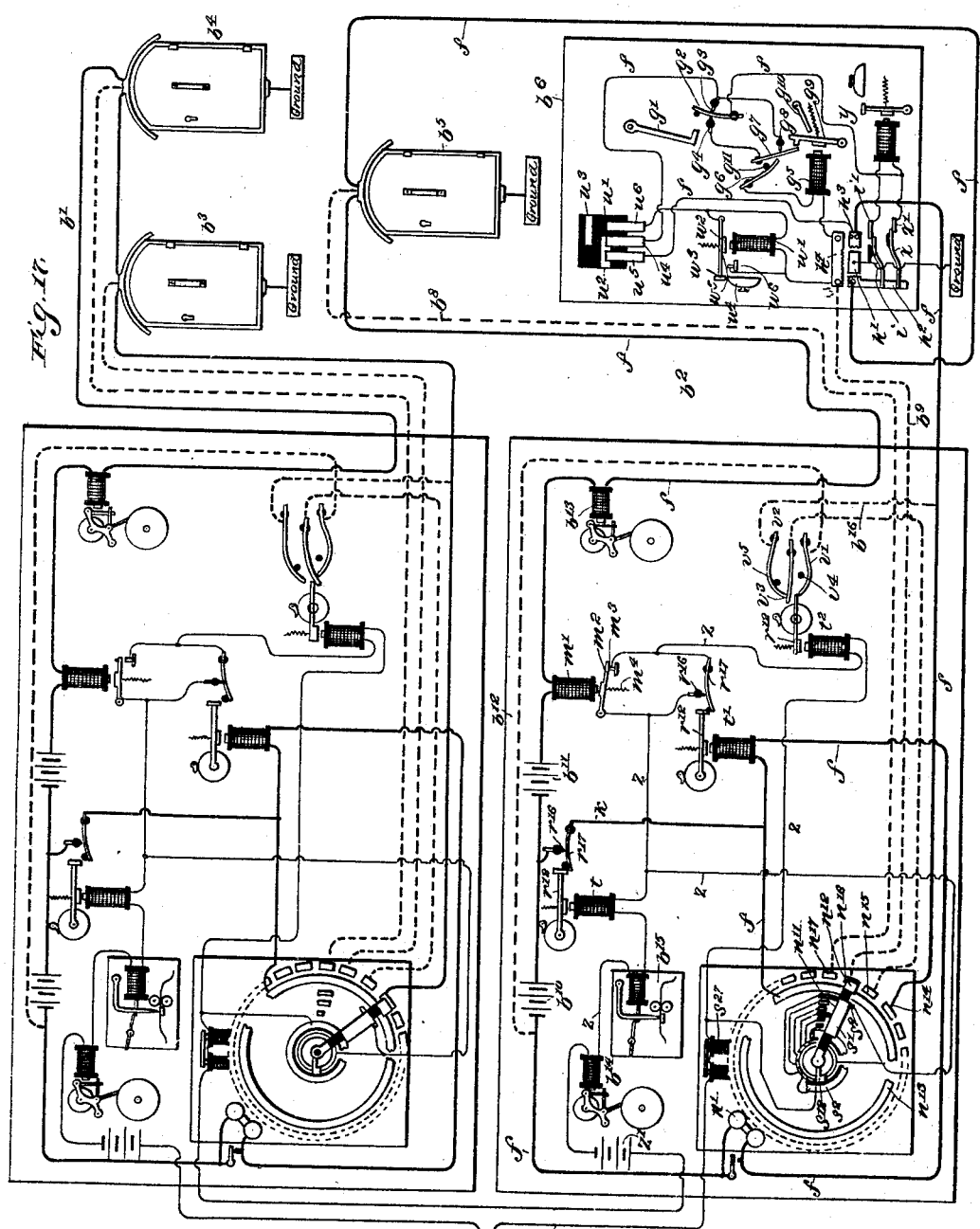
Witnesses:
H. W. Doughty
A. E. Pope
Inventor:
Clarence E. Beach

UNITED STATES PATENT OFFICE.

CLARENCE E. BEACH, OF BINGHAMTON, NEW YORK, ASSIGNOR TO STAR ELECTRIC COMPANY, A CORPORATION OF NEW YORK.

APPARATUS FOR THE TRANSMISSION OF SIGNALS.

SPECIFICATION forming part of Letters Patent No. 697,065, dated April 8, 1902.

Application filed April 6, 1896. Serial No. 586,464. (No model.)

*To all whom it may concern:*

Be it known that I, CLARENCE E. BEACH, a citizen of the United States, residing at Binghamton, in the county of Broome and State of New York, have invented certain new and useful Improvements in Apparatus for the Transmission of Signals; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a novel system and apparatus for the transmission of signals.

The object of my invention is to produce a system adapted for fire and police alarm telegraph or for any use where it is required to transmit intelligence by means of preconcerted signals, differing from systems already in use in increased efficiency, simplicity, and reduced cost of construction and maintenance.

My system is adapted to be used in all cases where distinctive signals are to be produced at one or more principal points from any number of outlying stations.

In order that the construction and operation of my system may be clearly understood, I will illustrate and describe it in its application to fire-alarm service, retaining as far possible the names commonly used to designate the different parts of such a system.

When it is desirable to indicate or record the signals representing a number of street-boxes at one or more points, as at fire-department headquarters, engine-houses, &c., it is preferable to divide such street-boxes into circuits or groups each of which has its own selecting and transmitting device, which in turn is connected to all other selecting and transmitting devices or with a central station. The mechanisms contained in the various principal points and street-boxes possess various novel features of construction and arrangement, which will be fully described, and finally embraced in the claims.

In constructing my invention I have made a radical departure from the systems heretofore in common use, the chief points of which may be summarized as follows: Instead of providing each street-box with a complete mechanism for producing a series of electrical impulses so grouped as to characterize such box and of connecting such mechanism with suitable instruments for visually and audibly recording said impulses whenever the mechanism contained in any of the boxes is manually released or wound I have aimed to avoid the use of all delicate parts and sensitive devices in the street-boxes by providing a mechanism which may be manually operated in a simple manner and which will produce a single change in the condition of the circuit affected thereby and maintain the change until such time as the signal may be acknowledged from the station to which the box is connected.

The signal-boxes located in any group or district are all arranged in series upon a normally closed main circuit communicating with the district station or engine-house. Each box is also provided with an individual wire extending from such box to the district station, over which, normally, no current is flowing.

The signal-boxes are arranged in such a manner that whenever one is operated the main circuit is opened and the individual or special circuit connected with one of the ends of the broken circuit in such a manner as to permit a device at the district station to identify the box which has been operated.

At a point conveniently located with reference to the boxes forming any circuit or group—as, for instance, an adjacent engine-house or district station—I locate a device controlled by the circuits connecting the various boxes and so arranged with reference to the individual circuits extending from said boxes that when the device is released by the opening of the main circuit it will successively connect with the various individual wires extending to the various boxes, commencing with the last box in the main circuit, until a wire is reached through which a circuit, including the box which has been operated, can be established. An arm of the device then rests in a position which corresponds to the particular box operated and upon a series of contacts belonging to an auxiliary circuit. A dial rotating with the arm is thus enabled to show at an opening a number designating the box which has been operated. When the selecting device has come to rest in such a position, means are provided whereby the auxiliary circuit will attempt to close periodically; but it is allowed to close only at such intervals as the series of contacts upon which the selecting-arm rests will permit. Distinctive impulses are thus produced in the auxiliary circuit which characterize the box which has been operated. After the distinctive impulses representing the box which has been operated have been repeated a predetermined number of times the arm of the selecting device will be returned to its normal position, and the mechanism in the box which has been operated will be so released as to cease to maintain the circuit connected with said box in the condition which it assumed when the box was operated and will return said circuit to its previous normal condition, whereupon the system will be in a position to receive a signal from any other box which may have been operated during the time in which the signal from the first box was being produced or which may be subsequently operated.

I also may provide the signal-boxes with a mechanism for effecting the change in the circuit hereinbefore referred to for a length of time which shall be under the control of the operator, means being provided whereby the operator will be notified that his signal has been properly distinguished by the selecting device. With this construction I may also provide means whereby the transmission of the signal in the auxiliary circuit will not take place immediately upon the selecting device being brought to rest, thus allowing time for the operator to return the circuit to its normal condition without influencing the auxiliary circuit.

I may also provide means whereby arbitrary signals differing from the one which designates that particular box may be transmitted to the auxiliary circuit from any of the boxes. Whenever two or more selecting devices are arranged to affect a common auxiliary circuit, I provide means whereby the transmission of any signal to said circuit will maintain at rest all selecting devices except the one from which such signal proceeds.

Other features of my invention will be pointed out in the claims at the end of this specification.

Figure 13:
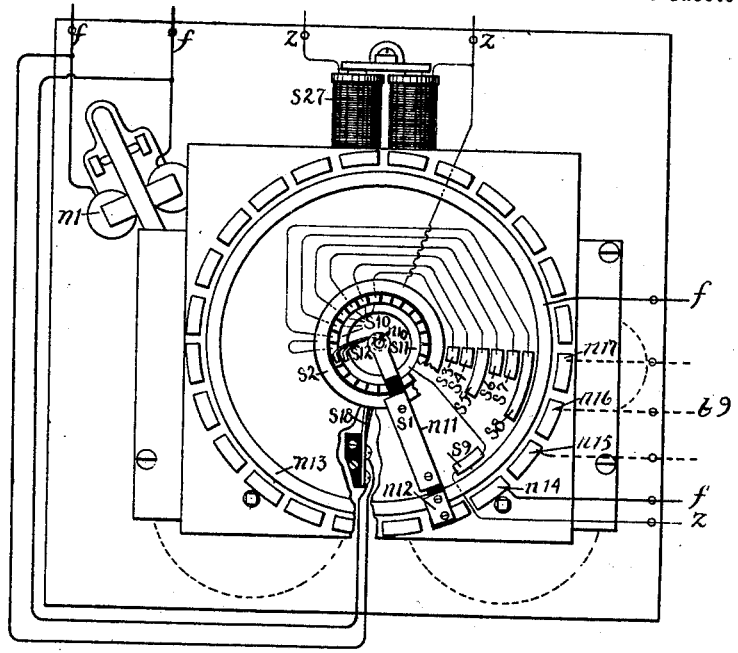
Figure 14:
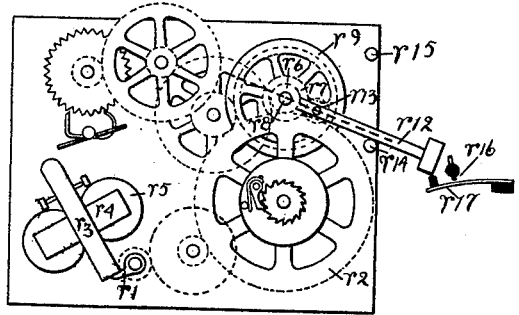
Figure 15:
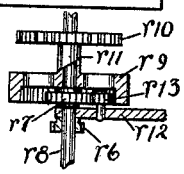
Figure 16:
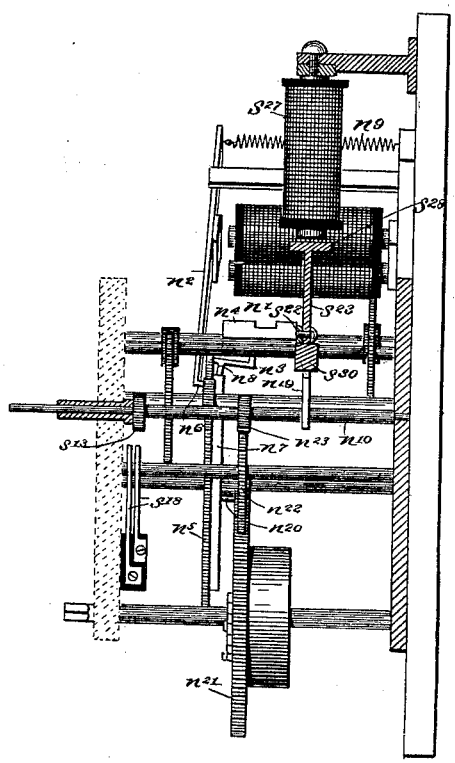

In the drawings forming part of this specification, Figure 1 is a diagrammatic view to illustrate my system as applied to a large city, the said drawing representing the system as divided into four districts communicating with a central office. Fig. 2 is a diagram of the circuits to more clearly enable the working of my system to be understood, the said figure showing method of arrangement of boxes and their connection to the selecting device upon any particular circuit and also the method of connecting two of said circuits in a manner which shall allow their coöperation. Fig. 3 is a front elevation of one of the street-boxes with the door open. Fig. 4 shows the mechanism upon the inside of the door of the box. Figs. 5, 6, and 7 are details to be referred to. Fig. 8 shows a key designed to operate a portion of the mechanism shown in Fig. 3. Fig. 9 illustrates diagrammatically the manner of connecting the different parts shown in Fig. 3. Fig. 10 is a front elevation of a portion of a mechanism embodying the selecting device and means for producing periodical attempts to close the auxiliary circuit. Fig. 11 is a detail to be referred to. Fig. 12 shows the appearance of the front of the complete mechanism, part of which is shown in Fig. 10 with a part of the opaque portion removed. Fig. 13 is a diagrammatic view showing the electrical connections with the mechanism shown in Fig. 10. Fig. 14 is a view of a mechanically-retarded relay. Fig. 15 is a section of a portion of the mechanism of the same. Fig. 16 is a section of a portion of the mechanism of Fig. 10. Fig. 17 is a diagram of the circuits similar to that given in Fig. 2, the various parts having assumed the positions they will occupy at a certain point in the operation of the system.

Referring to Fig. 1, I have chosen for the purpose of illustrating my invention to represent a city as subdivided into four fire-alarm districts, each fire-alarm district being provided with a district station, respectively designated $b$, $c$, $d$, and $e$, all of which are connected to a main or central station $a$. Each district station may have connected to it any desired or required number of fire-alarm circuits of the novel construction and arrangement which will be described, there being two such circuits represented as connected to the district station $b$, (designated $b'$ and $b^2$,) and one each connected to the district stations $c$, $d$, and $e$. The district stations and circuits extending therefrom are alike, and therefore the construction and arrangement of but one need be described in detail, and for this purpose I have represented in Fig. 2 the district station $b$.

Referring to Fig. 2, I have represented the circuit $b'$ as including two fire-alarm boxes $b^3$ and $b^4$, and the circuit $b^2$ as including the two fire-alarm boxes $b^5$ and $b^6$, the main parts of the box $b^6$ being laid out or shown in diagram to enable the working of my system to be more readily comprehended. The individual circuits connected to the district station are of like construction and arrangement. Therefore a detailed description of one will suffice for all of said district circuits.

Referring now to the circuit $b^2$, (shown in Fig. 2,) $f$ represents a normally closed metallic circuit, which constitutes the main circuit before referred to, which includes the boxes $b^5$ and $b^6$ and the district station $b$. In order that my system may be more clearly comprehended, I prefer to specifically describe in turn the construction and arrangement of the different parts.

The feature of the invention which I prefer to describe first is the construction and arrangement of a mechanism for producing a single change in the condition of the normally closed metallic circuit and subsequently restoring it to its previous condition, which mechanism is located at the point from which the signal is to be transmitted and may be contained in or form a part of a suitable box. This mechanism consists of the arm $g'$, so supported with reference to the spring $g^2$ as to be capable of being brought into engagement with said spring. The spring $g^2$ is suitably supported in such a manner that its tendency will be to rest against the contact-point $g^4$. The contact-points $g^3$ and $g^4$ are suitably supported in the path of the said spring $g^2$, and means are provided for normally maintaining the arm $g'$ in such a position as will hold the spring $g^2$ in contact with the point $g^3$. Means are also provided for drawing the arm $g'$ from the path of the spring $g^2$ whenever said arm has been released. The magnet $g^5$ is connected to the individual wire $b^9$ and also to the spring $g^6$. A spring $g^7$ is provided, the tendency of which is to rest against the contact-point $g^8$. However, the spring $g^6$ is so situated that the spring $g^7$ may be brought in contact with same. An armature $g^9$ is so placed as to be suitably influenced by the magnets $g^5$ and is provided with an extension permitting it to engage with and support the free end of an arm or tongue $g^{10}$, the said extension being placed within the path of the spring $g^7$ and arranged to maintain said spring in contact with the spring $g^6$ while the arm or tongue $g^{10}$ engages with said extension. A stop $g^{11}$ is provided for interrupting the contact between the springs $g^6$ and $g^7$ whenever the spring $g^7$ is allowed to come in contact with the point $g^8$. Electrical connection is provided between the contact-point $g^4$ and the spring $g^7$, also between the contact-points $g^3$ and $g^8$, one side of the circuit $f$ being connected to said points and the other side of said circuit being connected to the spring $g^2$.

I will now describe the selecting device, which is located in the district station and is so arranged with reference to the circuit-changing mechanism contained within the boxes and the wires connecting said mechanisms with the selecting device that said device will be released whenever the mechanism within any of the boxes has been so operated as to cause the change in the circuit hereinbefore referred to, and said device will again be brought to rest when the arm $n^{11}$, moving therein, shall have reached a position which corresponds to the particular box operated. This selecting device (shown particularly in Figs. 10, 11, 12, and 13) consists of the magnets $n'$, controlling a lever $n^2$, an extension $n^3$, which may be brought into engagement with portions of the fan-wheel $n^4$ when said arm is in a certain position. A wheel $n^5$, connected by a system of common gearing with the fan-wheel $n^4$ and revolving in suitable ratio thereto, is so placed with reference to the lever $n^2$ that a projection $n^6$, carried by said wheel, will during a portion of the revolution of said wheel prevent the magnets $n'$ from causing the lever $n^2$ to bring the extension $n^3$ into engagement with the fan-wheel $n^4$ and that the track $n^7$ will during the balance of the revolution of said wheel $n^5$ by means of its engagement with an extension $n^8$ from the lever $n^2$ prevent the spring $n^9$ from bringing said lever $n^2$ into such a position as will bring the extension $n^3$ into engagement with the fan-wheel $n^4$. The track $n^7$ does not extend completely around the wheel $n^5$, the portion of said wheel lying within the path of the extension $n^8$ when the projection $n^6$ is within the path of the lever $n^2$ not being provided with a track. Means are thus provided whereby the fan-wheel $n^4$ will be allowed to revolve freely while the magnets $n'$ are not energized and while the track $n^7$ is within the path of the extension $n^8$; but upon the magnets $n'$ being energized the extension $n^3$ will be brought within the path of the fan-wheel $n^4$. However, should the wheel $n^5$ revolve without the magnets $n'$ being energized to the position where a notch occurs in the track the spring $n^9$ will cause the projection $n^8$ to enter the notch, and thus allow the extension $n^3$ to interrupt the movement of the fan-wheel $n^4$, said extension now engaging with another portion of said fan-wheel than that with which it was caused to engage by the magnets $n'$. Should the magnets $n'$ now be energized, the projection $n^6$ will allow the lever $n^2$ to move a sufficient distance to release the fan-wheel $n^4$ and allow the same to revolve until the projection $n^6$ has advanced out of the path of said lever $n^2$. The system of gearing connecting the shaft $n^{10}$, Fig. 10, and wheel $n^5$ is so proportioned that when the wheel $n^5$ has attained a position bringing the notch in the track $n^7$ to its normal position the shaft $n^{10}$ will always be brought to its normal position, said system of gearing consisting of the pinion $n^{20}$, (see Fig. 11,) moving with the wheel $n^5$ and engaging with the wheel $n^{21}$, and the gear $n^{22}$, engaged by the wheel $n^{21}$ and engaging with the pinion $n^{23}$. (See Fig. 16.) The arm $n^{11}$ (see Fig. 13) is so fixed to the shaft $n^{10}$ as to revolve therewith, a portion of said arm being provided with brushes $n^{12}$, which rest upon the contact-ring $n^{13}$ and which may also rest upon any of the separately-insulated contacts $n^{14}$ $n^{15}$ $n^{16}$ $n^{17}$ and others arranged about the contact-ring $n^{13}$.

As shown in Fig. 12, provision is made whereby the shaft $n^{10}$ carries the radial arms $n^{18}$ and suitable letters, numerals, or groups of letters or other characters for determining the position of the arm $n^{11}$ with reference to the contacts $n^{14}$ $n^{15}$ $n^{16}$ $n^{17}$, &c.

The brushes $s'$, Fig. 13, carried by the arm $n^{11}$, are so situated as to rest upon the contact-ring $s^2$ and may be brought to rest upon the contacts $s^3$, $s^4$, $s^5$, $s^6$, $s^7$, $s^8$, and $s^9$ and others arranged similarly. These contacts, with the exception of contact $s^9$, are electrically connected with the contacts $s^{10}$, so that suitable groups of the former will be simultaneously connected with the ring $s^2$ by means of the brushes $s'$, so as to form successive paths for the current from the ring $s^{11}$ through brushes $s^{12}$ to the contact-ring $s^2$, the contact $s^9$ being connected to the contact-ring $s^{11}$.

I will next describe the transmitting device, by means of which the auxiliary circuit attempts to close periodically when the selecting device has come to rest in certain positions, said means consisting of certain mechanisms placed, preferably, adjacent to the selecting device and arranged to interlock therewith.

A sleeve is provided on the shaft $n^{10}$ of the selecting device and arranged to revolve independently of said shaft. The brushes $s^{12}$ and pinion $s^{13}$ (see Fig. 10) are attached to said sleeve, so as to revolve therewith, said pinion receiving its motion from the gear $s^{14}$, which is revolved by a system of ordinary gearing, the relation between the pinion and gear being such as to give the pinion one or more complete revolutions to each revolution of the gear, the number of such revolutions determining the number of times which the box-number shall be given by the transmitting device. The gear $s^{14}$ also carries a metallic disk $s^{15}$ and an insulating-disk $s^{16}$, containing at a suitable point a metallic contact $s^{17}$, which is in electrical connection with the disk $s^{15}$. The brushes $s^{18}$ are provided and rest, respectively, on the disks $s^{15}$ and $s^{16}$, thus providing means for establishing electrical connection between said brushes during a portion of the revolution of said disks; but as said brushes are separately mounted upon insulating material they will not be electrically connected during the greater portion of the revolution of the gear $s^{14}$. As shown in Fig. 13, the brushes $s^{18}$ are so connected with the magnets $n'$ that when electrical connection is formed between said brushes it forms a shunt around the magnets. The projection $s^{25}$ revolves with an escapement $s^{31}$, which is geared to the gear $s^{14}$, said escapement $s^{31}$ being provided for the purpose of regulating the speed of the gear $s^{14}$, and therefore of the brushes $s^{12}$. A cam $n^{19}$ is mounted upon the shaft $n^{10}$ to rotate therewith, and the arm $s^{30}$ is suitably pivoted, so that its free end may engage with the cam $n^{19}$. The arm $s^{23}$ is suitably pivoted, so that its path will include the free end of the arm $s^{30}$, or the arm $s^{30}$ may be omitted and replaced by pivoting the arm $s^{23}$ in suitable relation to the cam $n^{19}$. The armature $s^{28}$ is suitably attached to the free end of the arm $s^{23}$, and the magnets $s^{27}$ are provided in proper relation thereto. The attraction of the armature $s^{28}$ by the magnets $s^{27}$ should tend to rotate the arm $s^{23}$ in the same direction as it is rotated by the action of the cam $n^{19}$. The parts are so proportioned and arranged that when the cam $n^{19}$ is in the position shown in Fig. 10 it will cause the arm $s^{23}$ to bring the armature $s^{28}$ into close proximity with the magnets $s^{27}$; but when said arm $s^{23}$ is not being so supported by the cam $n^{19}$ it may be rotated to a point which will carry the armature $s^{28}$ a distance from the magnets $s^{27}$ where the attraction of the armature $s^{28}$ produced by the magnet $s^{27}$ would be insufficient to rotate the arm $s^{23}$. The arm $s^{22}$ is pivoted to the free end of the arm $s^{23}$, and the free end of said arm $s^{22}$ is so arranged that it may engage with the projection $s^{25}$ moving with the escapement-wheel $s^{31}$. The cam $s^{19}$ (a portion of which is shown in Fig. 10) is mounted to revolve with the gear $s^{14}$. The follower $s^{20}$ is so pivoted that its free end may rest upon the face of the cam $s^{19}$. The link $s^{21}$ connects the follower $s^{20}$ and arm $s^{22}$, so as to form a fulcrum around which the arm $s^{22}$ may be rotated by the arm $s^{23}$. The spring $s^{24}$ is connected to the arm $s^{22}$ and is arranged to exert its tendency in such direction as will cause the free end of said arm $s^{22}$ to engage with the projection $s^{25}$, and said spring $s^{24}$ is of sufficient tension to hold the follower $s^{20}$ against the face of the cam $s^{19}$ by means of the link $s^{21}$ and arm $s^{22}$. The spring $s^{26}$ is connected to the arm $s^{23}$ and is so applied to said arm $s^{23}$ as to tend to counteract the influence of the cam $n^{19}$ and magnets $s^{27}$, and said spring $s^{26}$ is of sufficient tension to more than counteract any influence imparted to the arm $s^{23}$ by the spring $s^{24}$ through the arm $s^{22}$.

The relative arrangement of the parts should be such that when the cam $n^{19}$ is in position shown in Fig. 10, where it exerts its greatest influence on the arm $s^{23}$, and the cam $s^{19}$ is also in the position shown, where it exerts least influence on the arm $s^{22}$, the free end of said arm $s^{22}$ will engage with and interrupt the rotation of the projection $s^{25}$, and when the cam $n^{19}$ has assumed a position where it ceases to influence the arm $s^{23}$ if the magnets $s^{27}$ are not energized the spring $s^{26}$ will rotate the arm $s^{23}$, and with it the pivoted end of the arm $s^{22}$, to a point which will disengage the free end of said arm $s^{22}$ from the projection $s^{25}$, and when the follower is resting against the cam $s^{19}$ at any point except at or near that of its greatest depression should the cam $n^{19}$ assume the position where it exerts its greatest influence upon the arm $s^{23}$ the action of said follower $s^{20}$ and link $s^{21}$ will prevent the free end of the arm $s^{22}$ from engaging with the projection $s^{25}$.

The position of the cam $n^{19}$ upon the shaft $n^{10}$ should be such with the relation to the arm $n^{11}$ (see Fig. 13) that said cam $n^{19}$ will exert its greatest influence on the arm $s^{23}$ while the brushes $n^{12}$ are passing over the contacts $n^{14}$ and $n^{15}$ and so that said cam $n^{19}$ will cease to influence the arm $s^{23}$ as soon as the brushes $n^{12}$ have left the contact $n^{14}$. The relation between the positions of the conducting portion contained within the disk $s^{16}$ and the depression in the cam $s^{19}$ should be such that in the operation of the device before said depression in cam $s^{19}$ will be brought within the path of the follower $s^{20}$ said conducting portion of the disk $s^{16}$ should cause the magnets $n'$ to be shunted, and thus release the fan-wheel $n^4$ from the projection $n^3$ and permit the continued rotation of said fan-wheel until the cam $n^{19}$ has assumed the position which counteracts the spring $s^{26}$ in its tendency to keep the lever $s^{22}$ out of engagement with the projection $s^{25}$.

As I have shown in Fig. 2, the magnets $s^{27}$ are included in the auxiliary circuit $z$, and as said magnets are intended to retain the armature $s^{28}$ after the brushes $s'$ have left the contact-strip $s^9$ and for various reasons hereinafter to be more fully pointed out it is preferable to maintain said auxiliary circuit until the arm of the selecting device had been brought to a standstill at a point representing a box, the operation of which had caused said arm to be removed from its normal position. I provide an ordinary relay $m$, (see Fig. 2,) consisting of the magnet $m'$, armature $m^2$, contact-point $m^3$, and tension-spring $m^4$, so constructed and arranged that the portion of the auxiliary circuit which includes the contact-ring $s^2$, brushes $s^{12}$, &c., will be shunted through the armature $m^2$ and contact-point $m^3$ of the said relay, except at such times as the magnet $m'$ shall be energized. This provision, as will be explained, effects the desired result.

I provide a mechanically-retarded relay $t$ for the purpose of establishing a shunt $k$ across the main circuit $f$, the object of this relay being to introduce said shunt whenever signals are being transmitted upon the auxiliary circuit, thus preventing any change which may occur in the metallic circuit $f$ during the transmission of such signals from so affecting magnets $n'$ as to interfere with the transmission of the signals. This relay may consist of any device of ordinary construction containing means whereby the interruption of one circuit will cause another circuit to be closed and being further arranged and constructed to maintain the second circuit closed for a longer period after the first circuit has been closed than the longest closed-circuit period occurring in the auxiliary circuit of my system during the transmission of a signal. I prefer, however, to provide in said device the construction and arrangement shown in Figs. 14 and 15, the construction of which I consider to be new and improved. The projection $r'$ is mounted upon a shaft which is geared to the wheel $r^2$, said projection being so placed with reference to the arm $r^3$ that when the armature $r^4$ is attracted by the magnets $r^5$ the arm $r^3$ will be brought within the path of said projection $r'$. The wheel $r^2$ is revolved in any ordinary manner and engages with the pinion $r^6$. The pinion $r^6$ and gear $r^7$ are fixed to the shaft $r^8$. The internal gear $r^9$ and the gear $r^{10}$ are fixed to the sleeve $r^{11}$, the sleeve $r^{11}$ and arm $r^{12}$ being so mounted upon the shaft $r^8$ as to be capable of revolving independently of said shaft and of each other. A pinion $r^{13}$ is secured to the arm $r^{12}$ in such position as to engage with the gear $r^7$ and the internal gear $r^9$. The gear $r^{10}$ is connected by a system of ordinary gearing with an escapement which controls the speed of the rotation of said gear. The stops $r^{14}$ and $r^{15}$ are provided for the purpose of limiting the movement of the arm $r^{12}$. The free end of the arm $r^{12}$ is so weighted as to enable said arm to rotate the internal gear $r^9$, gear $r^{10}$, and escapement operated thereby whenever said arm is not resting upon the stop $r^{14}$, and thus tend to bring said arm in contact with a circuit opening or closing device, consisting, for example, of a contact-point $r^{16}$ and a spring $r^{17}$. When the magnets $r^5$ are not energized, the arm $r^3$ will permit the projection $r'$ to rotate, which in turn will permit the gear $r^2$ to rotate, and the rotation of said gear $r^2$ by means of its engaging with the pinion $r^6$ will rotate the gear $r^7$. The pinion $r^{13}$, which engages with the gear $r^7$ and internal gear $r^9$, would thus be caused to rotate between said gears, and as said pinion $r^{13}$ is pivoted to the arm $r^{12}$ it would rotate said arm $r^{12}$ around the shaft $r^8$ in the direction of the stop $r^{15}$ and would cause said arm $r^{12}$ to attain the stop $r^{15}$ very quickly, owing to the direct connection between the wheels $r^2$ and pinion $r^6$. As soon as the weight of the arm $r^{12}$ is supported by the pinion $r^{13}$ (instead of the stop $r^{14}$, against which it has been resting) the influence of the pinion $r^{13}$ upon the internal gear $r^9$ would cause said internal gear to rotate, and thereby drive the system of gearing and escapement operated thereby, which operation will continue until the pinion $r^{13}$ is again relieved of the weight of the arm $r^{12}$. After the arm $r^{12}$ has come to rest against the stop $r^{15}$ the movement of the arm $r^{12}$ will be restrained by the escapement operated by the internal gear $r^9$, which will be rotated by the action of the gear $r^7$, transmitted through the pinion $r^{13}$. When the magnets $r^5$ are again energized, the arm $r^3$ will arrest the rotation of the projection $r'$, wheel $r^2$, and gear $r^7$, when the force of gravity upon the arm $r^{12}$ will continue the operation of the escapement driven by the interal gear $r^9$, thus allowing the arm $r^{12}$ to gradually fall until it again rests upon the stop $r^{14}$.

I will now describe the mechanism for effecting the same change in the circuit that is effected by the box mechanism $g'$ to $g^4$, inclusive, (see Fig. 2,) but leaving the duration of said change to the option of the operator, and, further, of notifying the operator that his signal has been properly distinguished by the selecting device, said mechanism being a circuit-changing device consisting of an insulating-block $u'$, provided with the contact-strips $u^2$ and $u^3$ and arranged to bring and maintain one of said strips in contact with such of the brushes $u^4$, $u^5$, and $u^6$ as said strips are respectively designed to connect. The insulating-block $u'$ may be moved in any ordinary manner, although I prefer to use a method which will be hereinafter more fully pointed out and described. The brushes $u^4$ and $u^5$ are included in the circuit $f$, the brush $u^6$ being connected to the individual wire $b^9$, extending from the box to the contact $n^{16}$ in the selecting device. A closed-circuit vibrating bell, consisting of the magnets $w'$, hammer $w^3$, gong $w^4$, contact-spring $w^5$, and contact-point $w^6$, is so constructed and included in the circuit extending from the brush $u^6$ that the contact-spring $w^5$ and contact-point $w^6$ will form a shunt around the magnet $w'$ whenever the armature $w^2$ is attracted thereby, thus allowing the bell to operate without interrupting the current in the line on which it is placed.

When it is desirable to enable the operator of the circuit-changing device to return the circuit $f$ to its normal condition after having indicated his signal by means of the numerals of characters carried by the selecting device and without causing impulses characterizing his signal to be transmitted over the auxiliary circuit, I provide a mechanically-retarded relay $t'$, which is similar in construction to the mechanically-retarded relay $t$, which I have hereinbefore described, the magnets of said relay being included in a portion of the metallic circuit $f$ between the magnets $n'$ and both the contact spring $r^{17}$ and contact-ring $n^{13}$. The contact spring and point included in the mechanically-retarded relay $t'$ are electrically connected in multiple with the armature $m^2$ and contact-point $m^3$ of the ordinary relay, thus providing a shunt around the parts $m^2$ and $m^3$ and preventing their opening the auxiliary circuit until the arm $r^{12}$ of the mechanically-retarded relay $t'$ shall have interrupted the contact between the point $r^{16}$ and the spring $r^{17}$. A closed-circuit strap-key $i$ and single-stroke bell $y$ of well-known construction if included in the metallic circuit $f$ will provide means whereby arbitrary signals differing from those characterizing the various boxes may be transmitted to the auxiliary circuit. I also may provide the mechanically-retarded relay $t^2$, which is similar to the mechanically-retarded relays $t$ and $t'$, except the arm $r^3$ and projection $r'$, which are so arranged as to be in engagement when the magnets $r^5$ are not energized and to disengage when said magnets $r^5$ are energized. The spring $r^{17}$ and contact-point $r^{16}$ are omitted in the relay $t^2$, being replaced by the springs $v'$, $v^2$, and $v^3$ and the stops $v^4$ and $v^5$. (See Fig. 2.) The free end of the spring $v^2$ lies within the path of the free end of the arm $r^{12}$, the tendency of said spring $v^2$ being to contact with the spring $v^3$ and leave the spring $v'$. The tendency of the springs $v'$ and $v^3$ is to press against the opposite sides of the spring $v^2$. The stops $v^4$ and $v^5$ prevent the springs $v'$ and $v^3$, respectively, from following the spring $v^2$ in its movement away from either of said springs more than a certain distance after it has contacted with the other of said springs. The escapement operated by the internal gear $r^9$ should in the case of this relay $t^2$ be so arranged that the time required for the arm $r^{12}$ to travel from the stop $r^{15}$ to the stop $r^{14}$ should be somewhat longer than the greatest pause between two impulses which are ever produced during the transmission of a signal from the circuit $f$ to the auxiliary circuit $z$. The spring $v'$ may be connected by means of the line $b^{12}$ with any point in the circuit $f$ lying between the battery $b^{10}$ and the magnets $n'$. The spring $v^2$ should be connected with the contact $n^{15}$, and spring $v^3$ should be connected with that portion of the circuit $f$ which lies between the boxes and the contact $n^{14}$. The battery $b^{10}$ is included in the circuit $f$ at such point with reference to the mechanically-retarded relay $t$ that the action of said relay may form a path for the current from said battery independent of that portion of the circuit $f$ which includes the signal-boxes $b^5$ and $b^6$. The battery $b^{11}$ is so placed with relation to the magnet $m$ of the ordinary relay, which is included in the line $f$, that the shunt produced by the mechanically-retarded relay $t$ will not provide a path for the current from said battery, which does not include the magnet $m'$ and the boxes $b^5$ and $b^6$.

In order that the application of my invention to fire-alarm service may be better understood, I have included in Fig. 2 a gong $b^{13}$, of ordinary construction, which is included in the main metallic circuit $f$, connecting the boxes, and is arranged to sound whenever said circuit is interrupted. I further show the gong $b^{14}$ of ordinary construction, and a register $b^{15}$, preferably of a construction shown in my application for Letters Patent bearing Serial No. 566,419, so included in the circuit $z$ as to indicate and record the impulses occurring therein. The batteries $z'$ may be included in any portion of the circuit $z$ except in the branches of said circuit which connect the relay $m$, mechanically-retarded relays $t'$ and $t^2$, separately-insulated contact $s^9$, contact-ring $s^2$, and contact-ring $s^{11}$.

I do not limit myself to using any particular form of signal-box or releasing mechanism, as the release of the arm $g'$ and the operation of the contact-strips $u^2$ and $u^3$ may be attained in any common or ordinary manner without departing from the spirit of my invention.

For the sake of facility in construction and precision in operation I may use the improved form of street-box shown and illustrated in Figs. 3, 4, 5, 6, 7, 8, and 9, consisting of the metallic containing-case $g^{12}$, which is similar in design to those in common use, upon the door of which is provided a releasing device consisting of the frame $g^{13}$, arranged to support a piece of glass or other fragile material $g^{14}$. A bracket $g^{15}$ is provided and supports a tube $g^{16}$, within which are arranged a spring $g^{17}$ and plunger $g^{18}$, the tendency of said spring being to force said plunger out of the tube. A projection $g^{19}$ is provided upon said plunger for the purpose of maintaining the glass $g^{14}$ in proper relation to said plunger, the arm $g'$ being provided with a projection which is constructed and arranged to engage with said projection $g^{19}$ whenever the plunger $g^{18}$ is being maintained in its normal position by the glass $g^{14}$. The spring $g^{20}$ is provided, the tendency of which is to move the arm $g'$ out of engagement with the contact-spring $g^2$. The contact-points $g^3$ and $g^4$, also the restoring device, including the parts $g^5$ to $g^{11}$, inclusive, are supplied, being constructed and arranged in the manner hereinbefore described.

I prefer to mount the insulating-block $u'$ upon the cylinder $u^7$, which is supported upon and revolves with the hollow shaft $u^8$. A portion of said cylinder, the shaft, and a portion of the box adjacent thereto are provided with a recess $u^9$ suitable to receive a key. A portion of the frame supporting the end of said cylinder farthest from the side of the case is provided with a movable pin $u^{10}$, which is held against the side of said cylinder by means of the spring $u^{11}$. A hole $u^{12}$, opening into the recess $u^9$ in the cylinder, is provided, said hole being so situated that the pin $u^{10}$ will normally be in the same when the cylinder is in such position as will bring the contact-strip $u^2$ under the brushes $u^4$ and $u^5$, in which position the portions of the recess $u^9$ in the case and in the cylinder will correspond. I provide an opening in the side of box $g^{12}$, protected from the weather by the hood $g^{21}$, through which the operator of the device may be notified when his signal has been indicated by the selecting device. I also provide a key $u^{13}$, (shown in Fig. 8,) provided with a projection $u^{14}$, which is constructed and arranged to disengage the pin $u^{10}$ from the cylinder $u^7$ and to then revolve said cylinder. I also provide a closed-circuit vibrating bell $m^4$, which has hereinbefore been more fully described. A lightning-arrester $h$ is mounted upon the board $g^{24}$ and consists of the plates $h'$, $h^2$, $h^3$, and $h^4$, a closed-circuit strap-key $i$ being attached to the plate $h^2$. An open-circuit strap-key $x$ is also provided upon said plate $h^2$ and arranged to connect with a strip $x'$ when the post $x^2$, carried by the door of said box, is brought into engagement with the insulating material provided upon said key. In electrically connecting the various devices included in this box, as shown in Fig. 9, I attach two free ends of the metallic circuit $f$ to the plates $h^2$ and $h^3$, respectively. I further connect an individual circuit—for example, the circuit $b^9$—to the plate $h^4$, the plate $h'$ being connected to the ground in a common manner. Electrical connection is then provided from plate $h^3$ to the brush $u^5$, from the brush $u^4$ to both the contact-points $g^3$ and $g^8$, from the contact-spring $g^2$ to one wire from magnets $y'$ and the contact-strip $x'$, from the other wire from magnets $y'$ to stationary contact $i'$ of key $i$, from point $g^4$ to spring $g^7$, from spring $g^6$ to one of the wires from magnet $g^5$, from other wire of magnet $g^5$ to plate $h^4$, from brush $u^6$ to both the armature $w^2$ and one wire from magnet $w'$ of the closed circuit-bell, from contact-point $w^6$ and other wire from magnet $w'$ to contact-plate $h^4$.

Having now described the construction and arrangement of the various devices which comprise the separate parts of my invention, I will now proceed to describe how they cooperate in the successful working of my system. The general features of the operation have already been mentioned. I will therefore endeavor in this description to give the operation of the system in detail, tracing each change as it occurs in the order of time.

Assuming then that each part of the system has returned to its normal condition after any changes which may have occurred previously, I will trace the operation incident to producing at as many principal points as desired the signal which shall indicate at these points that a particular fire-alarm box has been operated. The only manual operation necessary to send an ordinary alarm is to break the plate of glass or other fragile material provided upon the door of the box, as shown in Figs. 3 and 9. When this has been done, the plunger $g^{18}$, no longer restrained by the glass $g^{14}$, will be forced out of the tube $g^{16}$ a sufficient distance to allow the projection $g^{19}$ to be released from engagement with the end of the arm $g'$, which later will be drawn by the spring $g^{20}$ away from the spring $g^2$, so that said spring $g^2$ will break the contact heretofore preserved with the contact-point $g^3$ and will now rest against the contact-point $g^4$, or if the fracture of the glass $g^{14}$ has not for any reason been sufficiently complete to permit the spring $g^{17}$ to force the plunger $g^{18}$ out of the tube $g^{16}$ the pressure of the arm $g'$ against the projection $g^{19}$ will so revolve the plunger $g^{18}$ as to disengage said arm and projection. The circuit $f$ is the main-line circuit and is normally closed, and when all devices are in their normal position it passes from the battery $b^{10}$ through the battery $b^{11}$, through the magnets of ordinary relay $m$, through magnets of electromechanical gong $b^{13}$, and through each of the boxes, as $b^5$ and $b^6$. As the path of the current is alike through the various boxes, I will only describe the path of the current through the box $b^6$, which while the box was in its normal position was from plate $h^2$, at which it entered, through the strap-key $x$, (held closed by the post $x^2$ on the closed door,) to the spring $g^2$, thence through brush $u^4$, contact-strip $u^2$, and brush $u^5$ on the contact-changing device to plate $h^3$ and on to the next box in the circuit, or when the box is the last one on that side of the circuit, as $b^6$, the circuit $f$ passes from the plate $h^3$ to the contact $n^{14}$, thence through the brushes $n^{12}$, through the contact-ring $n^{13}$, through the magnet of mechanically-retarded relay $t'$, through the magnets $n'$, and back to the battery $b^{10}$. When by the operation just described the spring $g^2$ left contact with the contact-point $g^3$, the circuit $f$ was broken at this point and connection made through contact-point $g^4$, thence through the restoring device, with parts designated from $g^5$ to $g^{11}$, inclusive, the operation of which will be described later, to plate $h^4$, which is connected to the individual wire extending to the contact $n^{16}$, which corresponds to the box $b^6$ within the selecting device. The condition of affairs is now as follows: The circuit $f$, which includes all of the boxes in this district, has been broken at $g^3$ and one end connected to the individual wire extending from this box. The circuit is now open, since no connection exists on the contact $n^{16}$ at the selecting device. Next directing our attention to the selecting and transmitting device, Fig. 2, we see that the circuit $f$ which existed previous to the change made when the box was operated led through contact $n^{14}$, through the brush $n^{12}$ to the contact-ring $n^{13}$, thence through the mechanically-retarded relay $t'$, through the magnets $n'$ of the selecting device to the opposite side of the batteries $b^{10}$ and $b^{11}$, from which it started on its circuit of the district. The effect of the passage of the current through the magnets $n'$ of the selecting device (see Fig. 11) was to cause the lever $n^2$ to be brought to such position after the projection $n^6$ had been withdrawn from its path as to restrain the movement of the fan-wheel $n^4$ by causing the projection $n^3$ to engage with said fan-wheel. When the current was broken through these magnets, the spring $n^9$ caused the projection $n^8$ to rest against the track $n^7$, provided on the wheel $n^5$, so that the projection $n^3$ was withdrawn from the path of the fan-wheel. The latter then commenced to revolve and allowed the connected mechanism to revolve the shaft $n^{10}$, carrying the arm $n^{11}$, in clockwise direction. (See Figs. 13 and 2.) As this arm continued to revolve, carrying with it the brushes $n^{12}$, which would connect in turn to the contact-ring $n^{13}$, each of the separately-insulated contacts lying within the path thereof, it would presently come to the contact $n^{17}$ and after passing this to the contact $n^{16}$, to which the individual wire from the box $b^6$, which had operated, was attached. A circuit would now be established in the main circuit $f$ from the battery $b^{10}$, through the battery $b^{11}$, through the magnet of ordinary relay $m$, through magnet of gong $b^{13}$, and through box $b^5$ to plate $h^2$ of box $b^6$, from plate $h^2$ through strap-key $x$ (held closed by the post $x^2$ on the closed door) to the spring $g^2$, thence through post $g^4$, through springs $g^7$ and $g^6$, and through magnet $g^5$ to plate $h^4$, from plate $h^4$ through individual wire $b^9$ to contact $n^{16}$, thence through brushes $u^{12}$, through contact-ring $n^{13}$, through magnets of mechanically-retarded relay $t'$, and through magnets $n'$ back to the battery $b^{10}$. When the circuit was again established through the magnets $n'$, it caused them to attract their armature and draw the projection $n^3$ into engagement with the fan-wheel $n^4$, thus arresting its motion and holding the arm $n^{11}$ in position upon the contact $n^{16}$. As a consequence of the rotation of the mechanism of the selecting device when the fan-wheel $n^4$ was released the cam $n^{19}$, as shown in Fig. 10, was revolved, so as to allow the arm $s^{30}$ to cease engagement with the arm $s^{23}$, the latter, however, being retained in its position by the attraction of the magnets $s^{27}$.

The changes in the other devices which have accompanied the operation already detailed are the following: When the circuit $f$ was broken, (see Fig. 2,) the gong $b^{13}$ struck one blow, the ordinary relay $m$ released its armature, thus closing a portion of the auxiliary circuit controlled by it, and the mechanically-retarded relay $t'$ also closed the multiple contact which it controlled. The auxiliary circuit is normally closed and is energized by the batteries $z'$. While the arm $n^{11}$ was in its normal position, with the brush $n^{12}$ resting on the contact $n^{14}$, the auxiliary circuit after passing through a gong, a register, and the mechanically-retarded relay $t$ finds a path through the contact $s^9$, the brush $s'$, the contact-ring $s^2$, thence through the magnets $s^{27}$, through the auxiliary circuit of any other district station which may be connected therewith, and through the batteries. The connection through the selecting device, however, is broken as soon as the arm $n^{11}$ leaves the contact-piece $s^9$; but as soon as the circuit $f$ was broken and before the arm $s^{11}$ has had sufficient time to break the connection of the auxiliary circuit at the contact-piece $s^9$ the ordinary relay $m$ and the mechanically-retarded relay $t'$ both have closed contacts in multiple on a shunt to the part of the auxiliary circuit through the magnets $s^{27}$. At the same time that the shunt was formed on the auxiliary circuit around the break produced in the selecting device the mechanically-retarded relay $t^2$, which is included in the shunt just mentioned, connected the two contacts $n^{14}$ and $n^{15}$ by allowing the spring $v^2$, which is connected to contact $n^{15}$ and which was previously held in contact with the spring $v'$, to exert its tendency to leave contact with spring $v'$ and to make contact with spring $v^3$, which is connected to contact $n^{14}$.

The above-described action of the mechanically-retarded relay $t^2$ has no direct influence upon the action of the various devices in selecting and transmitting the signal from the box $b^6$; but such action takes place for a purpose which will be hereinafter more fully pointed out in connection with the description of the operation of the various parts of my system when a signal is to be transmitted from the key $i$, forming part of each of the signal-boxes.

When the arm $n^{11}$ has come to rest upon the contact $n^{16}$ and again established a current through a portion of the circuit $f$ and completed it through the individual wire $b^9$, extending from the box $b^6$, which has been operated, the ordinary relay $m$ immediately breaks the contact which it controls on the shunt to the auxiliary circuit, and the mechanically-retarded relay $t'$, after a fixed length of time, also breaks the contact which it controls. (See Fig. 17.) This last operation finally completely opens the auxiliary circuit, one effect of which is to announce that an alarm is to be sent in by a single blow upon the gong $b^{14}$. Another effect is to cause the mechanically-retarded relay $t$ to immediately close the contact which it controls, and thus complete the shunt $k$, which is placed so as to include the batteries $b^{10}$, the magnets of the mechanically-retarded relay $t'$, and the magnets $n'$ of the selecting device. The effect of this is to protect the operation of the transmitting device from disturbance from any change which may occur by reason of the operation of another box before the transmitting device has finished the alarm from the first. Another effect of opening the auxiliary circuit was to cause the magnets $s^{27}$ of the transmitting device to release their armature $s^{28}$ (see now Fig. 10) and by the action of spring $s^{26}$ to withdraw the end of the lever $s^{22}$ from engagement with the projection $s^{25}$. When this engagement ceases, the mechanism of the transmitting device is set in motion by the propelling force which is controlled by the escapement $s^{31}$. This motion is imparted to the gear $s^{14}$ and through it to the pinion $s^{13}$.

Considering now the electrical connections of the auxiliary circuit when the arm $n^{11}$ rests upon the contact-piece $n^{16}$, we have the following, (see Fig. 13:) One end of the auxiliary circuit $z$, connected to the contact-ring $s^2$, from which through the brush $s'$ to the contact-points $s^5$ and $s^8$, from each of these to one of the insulated contacts arranged about the contact-ring $s^{11}$, which contact-ring forms the other end of the auxiliary circuit. A direct connection is also provided from the contact-ring $s^2$ to one of the insulated contacts arranged about the contact-ring $s^{11}$. Having, then, this arrangement in mind, it is evident that when the brushes $s^{12}$ revolve upon being released, as previously explained, they will connect such of these insulated contacts with contact-ring $s^{11}$ as are included in the auxiliary circuit through the brush $s'$. At each of such closures the auxiliary circuit will operate any gongs or registers which may be included in the circuit. In the present case the circuit will be closed while the brush passes the insulated contact provided with direct connection with the contact-ring $s^2$, again at the next insulated contact, and after passing two without effect close again at the third insulated contact, and then pass without effect all the other insulated contacts, thus producing impulses which shall denote the number "21," which may thus designate the box.

It is evident that any arrangement of impulses might be secured which would represent any desired box-number by connecting the contacts upon which the brush $s'$ would come to rest to suitably-insulated contacts. For instance, if the arm $n^{11}$ should rest upon contact-piece $n^{17}$ the brush $s'$ would rest upon contacts $s^3$, $s^4$, $s^5$, $s^6$, $s^7$, and $s^8$ and would, with the connections to the insulated contacts shown, designate the number "7." When the pinion $s^{13}$, (see Fig. 10,) influencing the brushes $s^{12}$, has revolved a sufficient number of times to allow its engaging gear $s^{14}$ to revolve once, the brushes $s^{18}$ will be connected by having the metallic contact $s^{17}$ contained within the insulating-disk $s^{16}$ brought under them. When this occurs, a shunt is placed across the terminals of the magnets $n'$, causing them to release their armature, (see Fig. 11,) and thus allow the extension $n^8$ to rest against the track $n^7$, in which position projection $n^3$ is within the path of the notch in the fan-wheel $n^4$. The selecting mechanism will thereby be released and revolve the arm $n^{11}$. The moment that the brush $n^{12}$, carried by the arm $n^{11}$, leaves the contact $n^{16}$, upon which it has rested, it breaks the circuit $f$, and by so doing causes the ordinary relay $m$ to close the contact, which it controls on the shunt to the auxiliary circuit, and cause the mechanically-retarded relay $t^2$ to immediately connect the contact $n^{15}$ to the contact $n^{14}$, as will be hereinafter more particularly explained in connection with the description of the operation of the devices constituting my system during the transmission of a signal from the key $i$, forming part of each of the signal-boxes.

Returning now for a moment to the box mechanism, (see Fig. 9,) the effect of closing the circuit $f$ through the individual wire $b^9$ of the box was to cause the magnet $g^5$ to attract its armature $g^9$ and to allow the arm or tongue $g^{10}$ to move from engagement therewith. When the current in the circuits $f$ and $b^9$ was broken as just provided by the movement of the brush $n^{12}$ from the contact $n^{16}$, the armature $g^9$ will be allowed to release the spring $g^7$ and allow it to exert its tendency to leave contact with spring $g^6$ and to make contact with the point $g^8$, thus connecting the incoming portion of circuit $f$ through spring $g^2$, which came in contact with point $g^4$ when the box was operated, to and through spring $g^7$ to point $g^8$, which is connected to the remainder of circuit $f$, thereby restoring to said circuit $f$ its original course through the remainder of the boxes to the normal contact $n^{14}$ of the selecting device. When (see Fig. 2) the brush $n^{12}$ makes contact at $n^{14}$, and thus completes the circuit $f$, the relay $m$ will open the contact, which it controls on the shunt, to the auxiliary circuit and cause the mechanically-retarded relay $t^2$ to disconnect the contacts $n^{14}$ and $n^{15}$ after a certain length of time, as previously explained, and the movement of the arm $n^{11}$, carrying the brush $n^{12}$, will be stopped by the action of the spring $n^9$, (see Fig. 11,) which will cause the projection $n^8$ to enter the notch in the track $n^7$, and thus arrest the movement of the fan-wheel by causing the extension $n^3$ to engage with it, when after sufficient time has elapsed the shunt which was placed on these magnets will be removed and the extension $n^3$ will be withdrawn from the notch in the track $n^7$ and arm $n^2$ will rest upon the projection $n^6$. In this position the mechanism of the selecting device was free to rotate until the projection $n^6$ had passed from beneath the arm $n^2$, when the mechanism would be brought to rest, with the arm $n^{11}$ (see Fig. 2) still resting upon its normal contact $n^{14}$. In the two positions last described the brush $s'$ upon the arm $n^{11}$ completes the branch of the auxiliary circuit through the selecting and transmitting device by connecting the contact $s^9$ with the contact-ring $s^2$. When the branch of the auxiliary circuit passing through the repeating device is thus restored, the mechanically-retarded relay $t$ will after a given time open the shunt $k$, which has protected the magnets $n'$ from disturbance during the operation of producing and repeating the signal. The various mechanisms described have now returned to their normal positions, from which they departed in the operation of producing an alarm from a signal-box. When the armature $g^9$ (see Fig. 9) and the releasing mechanism in the box which has been operated have been reset and the latter held in position by a new glass $g^{14}$, this box will again be in condition to cause another signal to be produced in the same manner as before.

Having described the operation of the devices engaged in the production of an ordinary signal, I will now describe the operation of a special device comprising a contact-changer and a vibrating bell, which may be located in the street-box for the purpose of indicating the location of the box operated at the district-station without producing an alarm upon the auxiliary circuit. When it is desired to accomplish this result, the key $u^{13}$ (shown in Fig. 8) is inserted in the recess $u^9$ in the contact-changing device, which is then revolved until the contact-strip $u^2$ has been removed from beneath the brushes $u^4$ and $u^5$ and the contact-strip $u^3$ has been brought under the brushes $u^5$ and $u^6$. The effect of this change will be to place the entering wire from the circuit $f$ in connection with the individual-box wire and to include in this circuit the vibrating bell—that is, to effect the same change that is effected by the operation of the box in the regular manner, with the exception of excluding the device $g^5$ to $g^{11}$ and including the vibrating bell. The circuit through the box would now be as follows: from the end of the circuit $f$, which is connected to the plate $h^2$, through strap-key $x$, (held closed by the post $x^2$ on the closed door,) through the spring $g^2$, through the contact $g^3$, through brush $u^4$, through contact-strip $u^3$, through brush $u^6$, and through magnet $w'$ to plate $h^4$, which is connected to the line $b^9$. The arm of the selecting device will now be released as a result of the interruption of circuit $f$, as before, and come to rest upon the contact corresponding to the box operated. The position of the arm $n^{11}$ will be shown by a dial which rotates with the shaft $n^{10}$ and arm $n^{11}$, as shown in Fig. 12, and which has the character or number designating the box so arranged that when the arm $n^{11}$ rests upon one of the contacts corresponding to a box this character or number will appear at an aperture provided for the purpose in the front of the selecting device. When the brush $n^{12}$ upon the arm $n^{11}$ closes the circuit through the individual-box wire, the vibrating bell within the box will make this fact known to the operator, who may then return the contact-changer to its original position, whereupon the arm of the selecting device will return to its normal position and the system will again be in its normal condition.

The operation of the various devices by which the repeating device is prevented from transmitting such signal over the auxiliary circuit is as follows: The transmitting device is released and allowed to transmit a signal over the auxiliary circuit only after that circuit has been completely broken, as has been previously described. The branch of the auxiliary circuit through the transmitting device is broken as soon as the arm $n^{11}$ leaves its normal position; but the breaking of the current through the main circuit which released the arm also caused the contacts controlled by the ordinary relay $m$ and the mechanically-retarded relay $t'$ to close and open a path for the auxiliary circuit through the branch controlled by these contacts; but since the ordinary relay $m$ would again open its contact when the main circuit was closed the mechanically-retarded relay $t'$ is provided in order that if at any time within the period which would elapse between the closing of the main circuit and the opening of the contact controlled by said mechanically-retarded relay $t'$ the operator should return the contact-changing device to its normal position the selecting device will return to its normal position, as before described, without transmitting an alarm over the auxiliary circuit. The operation of the devices by means of which arbitrary signals may be sent over the line is as follows: The course of a current in the main circuit when a box is in its normal condition is through plate $h^2$, through strap-key $x$, to the spring $g^2$; but when the door of the box is opened the post $x^2$ is withdrawn from engagement with the strap-key $x$, which is then allowed to exert its tendency to open its contact, thus diverting the current through key $i$ and the bell $y$. If now the key $i$ be opened for a moment, the arm $n^{11}$ of the selecting device will be released and commence to rotate.

At the same time the mechanically-retarded relay $t'$ will immediately close the branch of the auxiliary circuit which it controls through the mechanically-retarded relay $t^2$, which will then immediately connect contact $n^{15}$ to contact $n^{14}$, as before explained. The arm $n^{11}$ will then come to rest upon contact $n^{15}$, thus reëstablishing the current in the circuit $f$, whereupon the mechanically-retarded relay $t$ will immediately close the contact which it controls upon the shunt $k$, and thereby maintain the mechanically-retarded relay $t'$ and the arm $n^{11}$ in their positions, regardless of breaks which may occur in the external circuit by the operation of the key $i$. Any breaks in the circuit thus produced will now be transmitted to the auxiliary circuit by means of the ordinary relay $m$ and operate the gongs and registers included in this circuit, provided the time which elapses between such breaks shall not be sufficient to allow the mechanically-retarded relay $t^2$ to permit the arm $n^{11}$ to return to its normal position by shunting the magnets $n'$, controlling the motion of said arm, and allowing them to release the mechanism, which will then move until it is mechanically stopped, when the extension $n^8$ enters the notch in the track $n^7$. The shunting of the magnets $n'$ is accomplished when the mechanically-retarded relay $t^2$ brings the spring $v^2$ in contact with the spring $v'$ before the former has left contact with the spring $v^3$, thus providing a path for the current from one side of the said magnets through the line $b^{12}$, spring $v'$, spring $v^3$, and line $b^{16}$ again to the line $f$. When the mechanically-retarded relay $t^2$ has completed its movement, the shunt will be removed from the magnets $n'$ by the spring $v^2$ breaking contact with the spring $v^3$. The arm $n^{11}$, till now held mechanically in position upon the contact $n^{14}$, will allow the current in circuit $f$ to pass by its normal path and release the mechanical stop and maintain the arm in position by the action of the magnets $n'$ and their connected restraining device. The auxiliary circuit now being closed by its path through the selecting device will open the shunt $k$, controlled by the mechanically-retarded relay $t$, and the system will again be in its normal condition.

Should the circuit $z$ be interrupted when the various parts are in their normal position—as, for instance, by the transmission of a signal from the central station or from other devices which might be included in said auxiliary circuit $z$—such interruption would not only result in the operation of the devices $b^{14}$ and $b^{15}$, but the flow of current being interrupted in the magnets of mechanically-retarded relay $t$ said relay would immediately close the contact which it controls upon the shunt $k$, and thereby maintain the mechanically-retarded relay $t'$ and the arm $n^{11}$ in their normal positions, regardless of any change which might occur in the circuit $f$ or lines $b^8$ $b^9$, &c. Such interruption of the auxiliary circuit would also cause the magnets $s^{27}$ to release their armature $s^{28}$, (see Fig. 10,) which, however, would not effect the release of the projection $s^{25}$, which restrains the transmitter mechanism, as the cam $n^{19}$ stands in the position shown in Fig. 10 when the arm $n^{11}$ is in its normal position, as shown in Fig. 2, thus preventing the spring $s^{26}$ from disengaging the arm $s^{22}$ from the projection $s^{25}$ by retaining the armature $s^{28}$ in close proximity to the poles of the magnets $s^{27}$. It will now be readily understood that closures and breaks in the auxiliary circuit $z$ will cause the operation of the sounding and recording instruments $b^{14}$ and $b^{15}$, but will not effect the release of the transmitter by its magnets $s^{27}$, nor will such impulses cause the mechanically-retarded relay $t$ to interrupt the shunt $k$ until the auxiliary circuit $z$ shall have remained closed for a period greater than the time required for said mechanically-retarded relay $t$ to complete its movement. When the auxiliary circuit $z$ has been closed for a sufficient period of time for the mechanically-retarded relay $t$ to complete its movement, the shunt $k$ will be broken, thus placing the parts of my system in their normal position, provided that one of the boxes $b^5$ or $b^6$ was not operated during the time the shunt $k$ was maintained. If while the shunt $k$ was closed the circuit $f$ was interrupted—as, for instance, by the operation of the box $b^6$—as soon as the movement of the mechanically-retarded relay $t$ interrupts the shunt $k$ the current through the magnets of relay $t'$ and magnets $n'$ of the selecting device will be interrupted, thus releasing the train operating the arm $n^{11}$ in the manner and with the results hereinbefore described in connection with the explanation of the operation of my system when all parts are in their normal position and the glass in one of the boxes is fractured.

What I claim as new, and desire to secure by Letters Patent, is—

1. Signal-boxes, a selector controlled by said signal-boxes, a transmitter, an auxiliary circuit, a circuit-closer forming part of the transmitter and included in said circuit, and connections between the selector and transmitter so arranged as to suitably vary the number and arrangement of the closures of the auxiliary circuit.

2. Signal-boxes, a suitable system of conductors connected with said signal-boxes, a selector connected to said conductors and arranged to respond to a change of connections between them, a transmitter to successively close an electric circuit, connections between the selector and transmitter so arranged as to suitably vary the number and arrangement of the closures of the auxiliary circuit, constructed for operation substantially as shown and described, so that, when said transmitter is operated the closures produced thereby will form a combination previously chosen to designate the existing connections between the conductors connected with the signal-boxes during the production of such closures.

3. Signal-boxes, a suitable system of conductors connected with said signal-boxes, a selector connected to said conductors and comprising controlling-magnets arranged to respond to a change of connections between them, an auxiliary circuit, a transmitter constructed and arranged to produce impulses in said circuit, constructed for operation substantially as shown and described, so that, the transmitter will be so governed by the selector that the impulses produced by the transmitter will form a distinctive combination previously chosen to characterize the individual conductor to which the selector-magnets are connected during the production of such impulses.

4. A general circuit, individual conductors, signal-boxes provided with means for diverting a portion of the general circuit through one of the individual conductors, a selector, magnets forming part of and controlling said selector, a series of separately-insulated contacts so coöperating with the selector as to cause said magnets to be successively connected to each of the individual conductors, an auxiliary circuit, a transmitter, and connections between the selector and transmitter so arranged as to suitably vary the number and arrangement of the closures of the auxiliary circuit, constructed for operation substantially as shown and described, so that, the transmitter will be so governed by the selector that the impulses produced by the transmitter will form a distinctive combination previously chosen to characterize the individual conductor to which the selector-magnets are connected during the production of such impulses.

5. A general circuit, individual conductors, signal-boxes provided with means for diverting a portion of the general circuit through one of the individual conductors, a selector, magnets forming part of and controlling said selector, a series of separately-insulated contacts so coöperating with the selector as to cause said magnets to be successively connected to each of the individual conductors, an auxiliary circuit, a transmitter, and connections between the selector and transmitter so arranged as to suitably vary the number and arrangement of the closures of the auxiliary circuit, constructed for operation substantially as shown and described, so that, the impulses produced in the auxiliary circuit at any time will be varied in number and arrangement by the connections existing between the conductors communicating with the signal-boxes.

6. A general circuit, individual conductors, signal-boxes provided with means for diverting a portion of the general circuit through one of the individual conductors, a selector, magnets forming part of and controlling said selector, a series of separately-insulated contacts so coöperating with the selector as to cause said magnets to be successively connected to each of the individual conductors, an auxiliary circuit, a transmitter, means controlled by the transmitter for closing the auxiliary circuit a number of times, and connections between the selector and transmitter so arranged as to suitably vary the number and arrangement of the closures of the auxiliary circuit.

7. A general circuit, individual conductors, signal-boxes provided with means for diverting a portion of the general circuit through one of the individual conductors, a selector, magnets forming part of and controlling said selector, a series of separately-insulated contacts so coöperating with the selector as to cause said magnets to be successively connected to each of the individual conductors, an auxiliary circuit, suitably-grouped separately-insulated contacts coöperating with the selector, constructed for operation substantially as shown and described, so that, the respective groups of contacts will be successively connected to one side of the auxiliary circuit, a transmitter, a second series of separately-insulated contacts, means controlled by the transmitter for successively connecting said contacts to the other side of the auxiliary circuit, and suitable connections between the suitably-grouped contacts coöperating with the selector and the second series of separately-insulated contacts.

8. A general circuit, a series of separately-insulated contacts connected to one side of said circuit, two magnetically-controlled trains, a selector operated by one of them to successively connect the other side of the general circuit to the contacts, an auxiliary circuit, means controlled by the other train for closing the auxiliary circuit a number of times, and means operated by the first train for suitably varying the number and arrangement of the closures of the auxiliary circuit.

9. A signal-causing mechanism, a movable part provided with a projection, glass or its equivalent arranged to so maintain the movable part as to restrain the signal-causing mechanism, a spring tending to disengage the movable part from the signal-causing mechanism whenever the glass is broken, and a suitably-supported tube containing the spring and movable part, all so constructed and arranged that if the glass or material be broken and the fracture is not sufficiently complete to permit the movable part to be disengaged from the signal-causing mechanism by the spring the pressure of the portion of the signal-causing mechanism against the projection will so revolve the movable part as to disengage the mechanism and projection.

10. A signal-causing station comprising; an electromagnet, an armature influenced thereby, an arm arranged to normally maintain the armature within the range of the attraction of the magnet and constructed and arranged to be withdrawn from the path of said armature whenever the armature is attracted by the magnet, a movable contact, a stationary contact against which said movable contact has a tendency to rest, an elastic contact so arranged with reference to the movable contact and contact-point that the movable contact will connect therewith whenever forced sufficiently far away from the stationary contact, a portion of the movable contact being placed within the path of said armature.

11. A signal-causing station comprising; an electromagnet, an armature influenced thereby and arranged to operate a circuit-changing device, an arm arranged to support said armature within the range of the attraction of the magnet at certain times and to disengage and be withdrawn from the path of the armature whenever it is attracted by the magnet, said circuit-changing device being constructed and arranged to maintain a certain electric circuit while the armature is being supported by the arm or being attracted by the magnet and to interrupt that circuit and establish another whenever the armature is neither supported by the arm or magnet.

12. A signal-causing station comprising; an electromagnet, an armature influenced thereby and arranged to operate a circuit-changing device, an arm arranged to support said armature within the range of the attraction of the magnet at certain times and to disengage and be withdrawn from the path of the armature whenever it is attracted by the magnet; said circuit-changing device being constructed and arranged to maintain a certain electric circuit while the armature is being supported by the arm or being attracted by the magnet and to interrupt that circuit and establish another whenever the armature is neither supported by the arm or magnet; said armature being constructed and arranged to be withdrawn from the range of the attraction of the magnet whenever it has been successively disengaged from the arm and released by the magnet.

13. A normally restrained signal; causing mechanism in combination with an electromagnet, an armature influenced thereby and arranged to operate a circuit-changing device, an arm arranged to support said armature within the range of the attraction of the magnet at certain times and to disengage and be withdrawn from the path of the armature whenever it is attracted by the magnet; said circuit-changing device being constructed and arranged to maintain a certain electric circuit while the armature is being supported by the arm or being attracted by the magnet, and to interrupt that circuit and establish another whenever the armature is neither supported by the arm or magnet.

14. A general circuit, a series of separately-insulated contacts connected to one side of said circuit, two magnetically-controlled trains, a selector-arm operated by one of them to successively connect the other side of the general circuit to the contacts, an auxiliary circuit, a second series of separately-insulated contacts, means controlled by the other train for successively connecting said contacts to one side of the auxiliary circuit, and means operated by the selector-arm for connecting distinctive groups of said contacts to the other side of the auxiliary circuit.

15. A general circuit, a series of separately-insulated contacts connected to one side of said circuit, two magnetically-controlled trains, a selector-arm operated by one of them to successively connect the other side of the general circuit to the contacts, an auxiliary circuit, a second series of separately-insulated contacts, means controlled by the other train for successively connecting said contacts to one side of the auxiliary circuit, suitably-grouped separately-insulated contacts connected with the second series of contacts, and means operated by the selector-arm for connecting distinctive groups of said contacts to the other side of the auxiliary circuit.

16. A general circuit, a series of separately-insulated contacts connected to one side of said circuit, two magnetically-controlled trains, a selector-arm operated by one of them to successively connect the other side of the general circuit to the contacts, an auxiliary circuit, a second series of separately-insulated contacts, means controlled by the other train for successively connecting said contacts to one side of the auxiliary circuit, suitably-grouped separately-insulated contacts connected with the second series of contacts, means operated by the selector-arm for connecting distinctive groups of said contacts to the other side of the auxiliary circuit, and a switch arranged to release the train operating the selector-arm whenever the other train has arrived at a certain point in its operation.

17. A general circuit, a series of separately-insulated contacts connected to one side of said circuit, two magnetically-controlled trains, a selector-arm operated by one of them to successively connect the other side of the general circuit to the contacts, an auxiliary circuit, a second series of separately-insulated contacts, means controlled by the other train for successively connecting said contacts to one side of the auxiliary circuit, suitably-grouped separately-insulated contacts connected with the second series of contacts, means operated by the selector-arm for connecting distinctive groups of said contacts to the other side of the auxiliary circuit, a shunt around the magnets controlling the train which operates the selector-arm, and a switch controlling said shunt and operated by the other train.

18. Signal-boxes provided with means for diverting a portion of a general circuit through an individual conductor, a suitable system of conductors connected with said signal-boxes, a selector connected with said conductors and arranged to respond to a change of connections between said conductors, a transmitter, an auxiliary circuit, a circuit-closer forming part of the transmitter and included in said circuit, suitably-grouped separately-insulated contacts coöperating with the selector and connected with the circuit-closer, constructed for operation substantially as shown and described, so that, the impulses produced in the auxiliary circuit at any time will be varied in number and arrangement by the connections existing between the conductors communicating with the signal-boxes.

19. A signal-causing station comprising; three or more brushes arranged to have their free ends rest upon a revoluble part provided with conducting-strips arranged to successively connect said brushes in pairs, an electromagnet, an armature influenced thereby and arranged to operate a circuit-changing device, an arm arranged to support said armature within the range of the attraction of the magnet at certain times and to disengage and be withdrawn from the path of the armature whenever it is attracted by the magnet, said circuit-changing device being constructed and arranged to maintain a certain electric circuit while the armature is being supported by the arm or being attracted by the magnet and to interrupt that circuit and establish another whenever the armature is neither supported by the arm or magnet and said armature being constructed and arranged to be withdrawn from the range of the attraction of the magnet whenever it has been successively disengaged from the arm and released by the magnet.

20. Signal-boxes provided with means for diverting a portion of a general circuit through an individual conductor, a suitable system of conductors connected with said signal-boxes, a selector connected with said conductors and arranged to respond to a change of connections between said conductors, a transmitter, an auxiliary circuit, a circuit-closer forming part of the transmitter and included in said circuit, a series of separately-insulated contacts forming part of and coöperating with the selector and connected with the circuit-closer, constructed for operation substantially as shown and described, so that, the impulses produced in the auxiliary circuit at any time will be varied in number and arrangement by the connections existing between the conductors communicating with the signal-boxes, a shunt between certain of the conductors which connect the selector with the signal-boxes, and a mechanically-retarded relay controlling said shunt and operated by the auxiliary circuit, constructed for operation substantially as shown and described, so that, said relay will prevent the operation of the selector during the transmission of impulses in the auxiliary circuit.

21. Signal-boxes provided with means for diverting a portion of a general circuit through an individual conductor, a suitable system of conductors connected with said signal-boxes, a selector connected with said conductors and arranged to respond to a change of connections between them, a transmitter, magnets forming part of and arranged to restrain said transmitter at certain times, an auxiliary circuit including said magnets, and a mechanically-retarded relay connected to the selector and controlling the auxiliary circuit; constructed for operation substantially as shown and described, so that, the transmitter will not be released until a predetermined time has elapsed after the selector has responded to a change of connections between the conductors connected therewith.

22. A magnetically-restrained normally wound motor, a pinion geared to said motor and revolving with a shaft, a gear fixed to said shaft, an arm mounted upon said shaft and arranged to revolve independently thereof, a pinion supported by said arm and engaging with the gear, an internal gear mounted upon said shaft to revolve independently thereof and engaging with said pinion, an escapement constructed and arranged to control the movement of the internal gear and a circuit-changing device operated by the arm when said arm is in a certain position.

23. A magnetically-restrained normally wound motor, a pinion geared to said motor and revolving a shaft, a revoluble arm mounted upon said shaft and moving independently thereof, a pinion supported by said arm and revolving therewith around the shaft and rotating on its own axis, a gear mounted upon and revolving with the shaft and engaging with said pinion, an internal gear so mounted upon said shaft that it may rotate independently thereof and surrounding the gear and engaging with the pinion, an escapement constructed and arranged to control the movements of the internal gear and a circuit-changing device operated by the arm when said arm is in a certain position.

24. Electromagnets, an armature influenced thereby, a revoluble part provided with a projection capable of engaging with a portion of said armature, a gear moving said revoluble part, a pinion engaging with said gear and with an internal gear, an arm influencing a circuit-changing device and operated by the movement of said pinion around the axis of the gear.

25. Electromagnets, an armature influenced thereby, a revoluble part provided with a projection capable of engaging with a portion of said armature, a gear moving with said revoluble part, an internal gear surrounding and moving independently of said gear, a pinion engaging with the gear and with the internal gear, an arm or lever supporting said pinion and arranged to derive a rotary motion from the movement of the pinion around the axis of the gear and a circuit-changing device influenced by the arm when said arm is in a certain position.

26. Electromagnets, an armature influenced thereby, a revoluble part provided with a projection capable of engaging with a portion of said armature, a gear moving with said revoluble part, an internal gear surrounding and moving independently of said gear, a pinion engaging with the gear and with the internal gear, an escapement arranged to retard the movement of the internal gear, an arm or lever supporting said pinion and arranged to derive a rotary motion from the movement of the pinion around the axis of the gear and a circuit-changing device influenced by the arm when said arm is in a certain position.

27. In a signal-selector; a magnet, an arm influenced thereby and carrying projections, a disk moving between said arm and one of the projections, said disk being provided with projections and indentations for influencing at certain times the position of said arm, and a revoluble part geared to said disk and provided with vanes or projections constructed and arranged to engage with a projection from the arm except when said arm is in a certain position.

28. A general circuit, a selector, magnets forming part of and controlling said selector and included in said circuit, signal-boxes provided with means for diverting a portion of the general circuit through an individual conductor, individual conductors extending from the signal-boxes to the selector, a switch forming part of the selector and so constructed that it may successively connect the individual conductors with the general circuit, a transmitter, an auxiliary circuit jointly controlled by the selector and said transmitter, a shunt around the selector in the general circuit, a mechanically-retarded relay controlling said shunt and operated by the auxiliary circuit, a relay included in the general circuit between the shunt and the signal-boxes, and a shunt for the auxiliary circuit around the selector and transmitter controlled by said relay.

29. In a signal-selector; a magnet, an arm influenced thereby and carrying projections, a disk moving between said arm and one of the projections, said disk being provided with projections and indentations for influencing at certain times the position of said arm, a revoluble part geared to said disk and provided with vanes or projections constructed and arranged to engage with a projection from the arm except when said arm is in a certain position, a normally wound train operating the disk and controlled by said revoluble part, and a commutating device operated by such train and controlling a number of electric circuits.

30. A general circuit, a selector, magnets forming part of and controlling said selector and included in said circuit, signal-boxes provided with means for diverting a portion of the general circuit through an individual conductor, individual conductors extending from the signal-boxes to the selector, a switch forming part of the selector and so constructed that it may successively connect the individual conductors with the general circuit, a transmitter, an auxiliary circuit jointly controlled by the selector and said transmitter, a shunt around the selector in the general circuit, a mechanically-retarded relay controlling said shunt and operated by the auxiliary circuit, a relay included in the general circuit between the shunt and signal-boxes, a shunt for the auxiliary circuit around the selector and transmitter controlled by said relay, and a mechanically-retarded relay included in the shunt for the auxiliary circuit around the selector and transmitter and so connected and arranged, that when the current is established in said shunt, said mechanically-retarded relay will immediately establish a connection between the general circuit and a conductor so connected to the switch operated by the selector, that the selector-magnets will arrest the operation of said selector when it has arrived at a point in its operation where it mechanically restrains the transmitter and interrupts the auxiliary circuit.

31. A transmitting device comprising; electromagnets, an arm influenced thereby, a lever pivoted upon said arm the free end of which is arranged to engage with and control a normally wound train, a disk provided with a suitable depression revolved by said train, a follower resting upon said disk and so connected with the lever that it may prevent the engagement of said lever with the train at certain times in spite of the action of the arm.

32. A general circuit, a selector, magnets forming part of and controlling said selector and included in said circuit, signal-boxes provided with means for diverting a portion of the general circuit through an individual conductor, individual conductors extending from the signal-boxes to the selector, a switch operated by the selector and so constructed that it may successively connect the individual conductors with the general circuit, a transmitter, an auxiliary circuit jointly controlled by the selector and said transmitter, a shunt around the selector in the general circuit, a mechanically-retarded relay controlling said shunt and operated by the auxiliary circuit, a relay included in the general circuit between the shunt and signal-boxes, a shunt for the auxiliary circuit around the selector and transmitter controlled by said relay, a mechanically-retarded relay included in the shunt for the auxiliary circuit around the selector and transmitter and so connected and arranged that when the current is established in said shunt said mechanically-retarded relay will immediately establish a connection between the general circuit and a conductor so connected to the switch operated by the selector that the selector-magnets will arrest the operation of said selector when it has arrived at a point where it mechanically restrains the transmitter and interrupts the auxiliary circuit, and a shunt around the selector-magnets controlled by said mechanically-retarded relay, constructed for operation substantially as shown and described, so that, when the circuit by which said relay is controlled has not been established for a predetermined period of time said shunt will be completed around the magnets of the selector.

33. A general circuit, a series of separately-insulated contacts connected to one side of said circuit, two magnetically-controlled trains, a selector operated by one of them to successively connect the other side of the general circuit to the contacts, an auxiliary circuit, means controlled by the other train for closing the auxiliary circuit a number of times, means operated by the first train for suitably varying the number and arrangement of the closures of the auxiliary circuit, and a switch arranged to release the train operating the selector-arm whenever the other train has arrived at a certain point in its operation.

34. A general circuit, a series of separately-insulated contacts connected to one side of said circuit, two magnetically-controlled trains, a selector operated by one of them to successively connect the other side of the general circuit to the contacts, an auxiliary circuit, means controlled by the other train for closing the auxiliary circuit a number of times, means operated by the first train for suitably varying the number and arrangement of the closures of the auxiliary circuit, a shunt around the magnets controlling the train which operates the selector-arm, and a switch controlling said shunt and operated by the other train.

35. A selecting device comprising; a magnet, an arm influenced thereby and carrying projections, a disk moving between said arm and one of the projections said disk being provided with projections and indentations for influencing at certain times the position of said arm, a revoluble part geared to said disk and provided with vanes or projections constructed and arranged to engage with a projection from the arm except when said arm is in a certain position, a normally wound train operating the disk and controlled by said revoluble part and a commutating device operated by such train and controlling a number of electric circuits; and a transmitting device comprising electromagnets, an arm influenced thereby, a lever pivoted upon said arm the free end of which is arranged to engage with and control a normally wound train, a disk provided with a suitable depression revolved by said train, a follower resting upon said disk and so connected with the lever that it may prevent the engagement of said lever with the train at certain times in spite of the action of the arm.

36. A general circuit, a series of separately-insulated contacts connected to one side of said circuit, two magnetically-controlled trains, a selector operated by one of them to successively connect the other side of the general circuit to the contacts, an auxiliary circuit, means controlled by the other train for closing the auxiliary circuit a number of times, means operated by the first train for suitably varying the number and arrangement of the closures of the auxiliary circuit, and means for releasing the train operating the selector-arm whenever the other train has arrived at a certain point in its operation.

37. A general circuit, a series of separately-insulated contacts connected to one side of said circuit, two magnetically-controlled trains, a selector operated by one of them to successively connect the other side of the general circuit to the contacts, an auxiliary circuit, means controlled by the other train for closing the auxiliary circuit a number of times, means operated by the first train for suitably varying the number and arrangement of the closures of the auxiliary circuit, a shunt for the general circuit, and a mechanically-retarded relay controlling said shunt and operated by the auxiliary circuit, so constructed that said relay will prevent the operation of the selector during the transmission of impulses in the auxiliary circuit.

38. A general circuit, a series of separately-insulated contacts connected to one side of said circuit, two magnetically-controlled trains, a selector operated by one of them to successively connect the other side of the general circuit to the contacts, an auxiliary circuit, means controlled by the other train for closing the auxiliary circuit a number of times, means operated by the first train for suitably varying the number and arrangement of the closures of the auxiliary circuit, a shunt for the general circuit, and a mechanically-retarded relay controlling said shunt and operated by the auxiliary circuit.

39. A general circuit, a series of separately-insulated contacts connected to one side of said circuit, two magnetically-controlled trains, a selector operated by one of them to successively connect the other side of the general circuit to the contacts, an auxiliary circuit, means controlled by the other train for closing the auxiliary circuit a number of times, means operated by the first train for suitably varying the number and arrangement of the closures of the auxiliary circuit, and a mechanically-retarded relay controlled by the general circuit and so controlling the second train that said train will not be released until a predetermined time has elapsed after the general circuit has been reëstablished.

40. A general circuit, a series of separately-insulated contacts connected to one side of said circuit, two magnetically-controlled trains, a selector operated by one of them to successively connect the other side of the general circuit to the contacts, an auxiliary circuit, means controlled by the other train for closing the auxiliary circuit a number of times, means operated by the first train for suitably varying the number and arrangement of the closures of the auxiliary circuit, and a mechanically-retarded relay connected with the selector and so controlling the other train that said train will not be released until a predetermined time has elapsed after the selector has come to rest.

41. A general circuit, a series of separately-insulated contacts connected to one side of said circuit, two magnetically-controlled trains, a selector operated by one of them to successively connect the other side of the general circuit to the contacts, an auxiliary circuit, means controlled by the other train for closing the auxiliary circuit a number of times, means operated by the first train for suitably varying the number and arrangement of the closures of the auxiliary circuit, means operated by the selector for interrupting the auxiliary circuit whenever the general circuit has been interrupted, and a mechanically-retarded relay controlled by the general circuit and so constructed and arranged that when the general circuit has been interrupted said relay will provide a shunt for the auxiliary circuit around the break produced by the selector and maintain said shunt until a predetermined period of time has elapsed after the general circuit has been reëstablished.

42. A general circuit, a series of separately-insulated contacts connected to one side of said circuit, a magnetically-controlled selector to successively connect the other side of the general circuit to the contacts, a magnetically-controlled transmitter, an auxiliary circuit jointly controlled by the selector and said transmitter, a shunt around the selector in the general circuit, and a mechanically-retarded relay controlling said shunt and operated by the auxiliary circuit.

43. A general circuit, a series of separately-insulated contacts connected to one side of said circuit, a magnetically-controlled selector to successively connect the other side of the general circuit to the contacts, a magnetically-controlled transmitter, an auxiliary circuit jointly controlled by the selector and said transmitter, a shunt around the selector in the general circuit, a mechanically-retarded relay controlling said shunt and operated by the auxiliary circuit, a relay included in the general circuit outside of the shunt, and a shunt for the auxiliary circuit around the selector and transmitter controlled by said relay.

44. A general circuit, a series of separately-insulated contacts connected to one side of said circuit, a magnetically-controlled selector to successively connect the other side of the general circuit to the contacts, a magnetically-controlled transmitter interlocking with the selector, an auxiliary circuit jointly controlled by the selector and said transmitter, a shunt around the selector in the general circuit, a mechanically-retarded relay controlling said shunt and operated by the auxiliary circuit, a relay included in the general circuit outside of the shunt, a shunt for the auxiliary circuit around the selector and transmitter controlled by said relay, and a mechanically-retarded relay included in the shunt for the auxiliary circuit around the selector and transmitter, and so connected and arranged that when a current is established in said shunt, said mechanically-retarded relay will immediately establish a connection between the general circuit and a separately-insulated contact so coöperating with the selector, that the selector will be stopped when it has arrived at a point in its operation where it mechanically restrains the transmitter and interrupts the auxiliary circuit.

45. A general circuit, a series of separately-insulated contacts connected to one side of said circuit, a magnetically-controlled selector to successively connect the other side of the general circuit to the contacts, a magnetically-controlled transmitter interlocking with the selector, an auxiliary circuit jointly controlled by the selector and said transmitter, a shunt around the selector in the general circuit, a mechanically-retarded relay controlling said shunt and operated by the auxiliary circuit, a relay included in the general circuit outside of the shunt, a shunt for the auxiliary circuit around the selector and transmitter controlled by said relay, a mechanically-retarded relay included in the shunt for the auxiliary circuit around the selector and transmitter, and so connected and arranged that, when a current is established in said shunt, said mechanically-retarded relay will immediately establish a connection between the general circuit and a separately-insulated contact so coöperating with the selector that the selector will be stopped when it has arrived at a point in its operation where it mechanically restrains the transmitter and interrupts the auxiliary circuit, and a circuit shunting the selector-magnets and so controlled by said mechanically-retarded relay that, when the general circuit has not been established for a predetermined period of time, the selector will be released.

In testimony whereof I affix my signature in presence of two witnesses.

CLARENCE E. BEACH.

Witnesses:
S. H. CHASE,
B. J. BROCKER.